US 6,734,966 B2

(12) United States Patent
McCarthy

(10) Patent No.: US 6,734,966 B2
(45) Date of Patent: May 11, 2004

(54) SPACE BORNE HIGH RESOLUTION HYPERSPECTRAL IMAGING INSTRUMENT OPTIMIZED FOR THE STUDY OF ATMOSPHERIC CONSTITUENTS

(75) Inventor: James K. McCarthy, Westchester, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 16 days.

(21) Appl. No.: 10/114,704

(22) Filed: Apr. 2, 2002

(65) Prior Publication Data

US 2003/0184748 A1 Oct. 2, 2003

(51) Int. Cl.$^7$ .................................................. G01J 3/18
(52) U.S. Cl. ........................ 356/328; 356/51; 356/305; 250/339.05
(58) Field of Search .......................... 356/51, 305, 326, 356/328; 250/226, 339.05

(56) References Cited

U.S. PATENT DOCUMENTS

| 5,276,321 | A | * | 1/1994 | Chang et al. | 250/226 |
| 5,394,237 | A | * | 2/1995 | Chang et al. | 356/328 |
| 5,835,214 | A | * | 11/1998 | Cabib et al. | 356/452 |
| 5,880,834 | A | * | 3/1999 | Chrisp | 356/328 |
| 6,122,051 | A | * | 9/2000 | Ansley et al. | 356/326 |
| 6,181,418 | B1 | * | 1/2001 | Palumbo et al. | 356/328 |
| 6,504,943 | B1 | * | 1/2003 | Sweatt et al. | 356/310 |

OTHER PUBLICATIONS

"Profiling A–band Spectrometer/Visible Imager (PABSI)"(2001). Available: http://cloudsat.atmos.colostate.edu/cs4c.html (Sep. 10, 2001).

Libbrecht, K.G. and Peri, M.L., "A Fiber–Fed Echelle Spectograph for the Hale 5–m Telescope"; Publications of the Astronomical Society of the Pacific, 107: pp. 62–67, Jan. 1995.

McCarthy, James K., Sandiford, Brendan A., Boyd, David and John Booth, "The Sandiford 2.1–m Cassegrain Echelle Spectrograph for McDonald Obsevatory: Optical and Mechanical Design and Performance", Publications of the Astronomical Society of the Pacific, 105: pp. 881–893, Aug. 1993.

McCarthy, James K., "The Reduction of Echelle Data with FIGARO", 4–24/25–90, Proceedings of $2^{nd}$ ESO/ST–ECF Data Analysis Workshop, pp. 119–124.

Gehren, T. and Ponz, D., "Echelle Background Correction", Astron. Astrophys. 168, pp. 386–388, 1996.

* cited by examiner

*Primary Examiner*—F. L. Evans
(74) *Attorney, Agent, or Firm*—Harness, Dickey & Pierce, P.L.C.

(57) ABSTRACT

A high resolution hyperspectral imaging apparatus (10) for analyzing atmospheric constituents. The apparatus (10) includes an optical telescope that receives an optical beam to be analyzed. A beam splitter (20) separates the optical beam into a first beam and a second beam that have separate wavelengths. A first spectrograph (72) analyzes the first beam and a second spectrograph (74) analyzes the second beam. Both spectrographs (72, 74) include a lens assembly (36, 44), a grating (42, 50) and a detector (54, 52). The gratings (42, 50) separate the beams into representative wavelengths that are recorded by the detectors (54, 52).

20 Claims, 7 Drawing Sheets

SPACE BORNE HIGH RESOLUTION HYPERSPECTRAL IMAGING INSTRUMENT OPTIMIZED FOR THE STUDY OF ATMOSPHERIC CONSTITUENTS

BACKGROUND OF THE INVENTION

1. Field of the Invention

The present invention relates generally to high resolution hyperspectral imaging and, more particularly, to space borne high resolution hyperspectral imaging for analyzing atmospheric constituents.

2. Discussion of the Related Art

There is a need in the art for sensing systems to determine the existence of certain atmospheric constituents present in the air. For example, awareness of the potential for rapid global environmental changes has led to a greater interest in the study of the global carbon cycle as it relates to the greenhouse gases $CO_2$ and $CH_4$ in the atmosphere. Space based sensing devices provide the ability to study changes in the concentration levels of these and other atmospheric gases from a remote location.

Known sensing systems have employed different types of sensors, including multi-spectral sensors, hyperspectral sensors, etc., for determining terrestrial, oceanic, and atmospheric properties. Typically, these systems employ sensors that receive reflected and emitted radiation from a field of view and direct the radiation into a spectrograph for analyzing the absorption characteristics of the scene. Hyperspectral imaging is a passive technique that combines spectral resolution with spatial resolution in two dimensions (e.g., the slit and temporal scan dimensions). The hyperspectral sensor creates a large number of spectra at typically low to moderate resolution from contiguous regions of the scene. A dispersing element in a spectrograph associated with the hyperspectral sensor breaks-up the light into its component wavelengths to provide the desired spectral resolution. In order to study atmospheric constituents with high accuracy, high spectral resolution is required. However, for a fixed number of detector channels, spectral coverage decreases as resolving power increases, and specific wavelength regions need to be targeted where certain features of interest are found.

Conventional hyperspectral sensors designed to address this problem have employed multiple sets of telescope plus spectrograph optical configurations for simultaneously measuring a plurality of atmospheric constituents over separate wavelength regions. However, multiple and duplicate optical instruments for studying more than one wavelength region result in a significantly larger system having large volumetric dimensions, mass, etc. For a space based system, it is desirable to deliver optimal payload performance with minimum volume, mass, and other mission-critical payload characteristics.

High spectral resolution also decreases the signal to noise quality of the detected spectrum. To compensate, it is generally necessary to increase the size of the light admitting optics, such as a receiving telescope, to increase the signal to noise quality. However, this also increases the payload characteristics in space based systems. While increases in signal quality are desirable, increases in payload volume and mass characteristics need to be minimized. Hence, there exists a need for an improved high spectral resolution hyperspectral imaging instrument having reduced mission critical payload characteristics for studying multiple atmospheric gases.

BRIEF SUMMARY OF THE INVENTION

In accordance with the teachings of the present invention, a high spectral resolution hyperspectral imaging system arranged within a compact payload volume is disclosed for studying atmospheric components. The system includes a single large aperture optical telescope having an objective lens that receives and focuses light from a particular field of view. A dichroic beam splitter divides the converging light into first (shortwave) and second (longwave) beams. A first spectrograph, including a lens assembly, a diffraction grating and a detector, receives and analyzes the first beam. The first beam propagates through a slit, is collimated by the lens assembly, and strikes the grating in the first spectrograph where it is separated into a first set of predetermined wavelengths. The separated first beam propagates back through the lens assembly acting now as a camera, and is focused onto the detector. A second spectrograph, including a lens assembly, a diffraction grating, and a detector, receives and analyzes the second beam. The second beam propagates through a slit, is collimated by the lens assembly, and strikes the grating in the second spectrograph where it is separated into a second set of predetermined wavelengths. The separated second beam propagates back through the lens assembly acting now as a camera and is focused onto the detector. Thus, a single large aperture telescope is used to receive light for two separate and compact high resolution spectrograph channels to analyze multiple regions of spectrum at high resolving power.

Additional objects, features and advantages of the present invention will become apparent from the following description and appended claims, taken in conjunction with the accompanying drawings.

DETAILED DESCRIPTION OF THE INVENTION

The following discussion of the preferred embodiments directed to a space borne high spectral resolution hyperspectral imaging instrument is merely exemplary in nature, and is in no way intended to limit the invention or its applications or uses.

Figure 1:
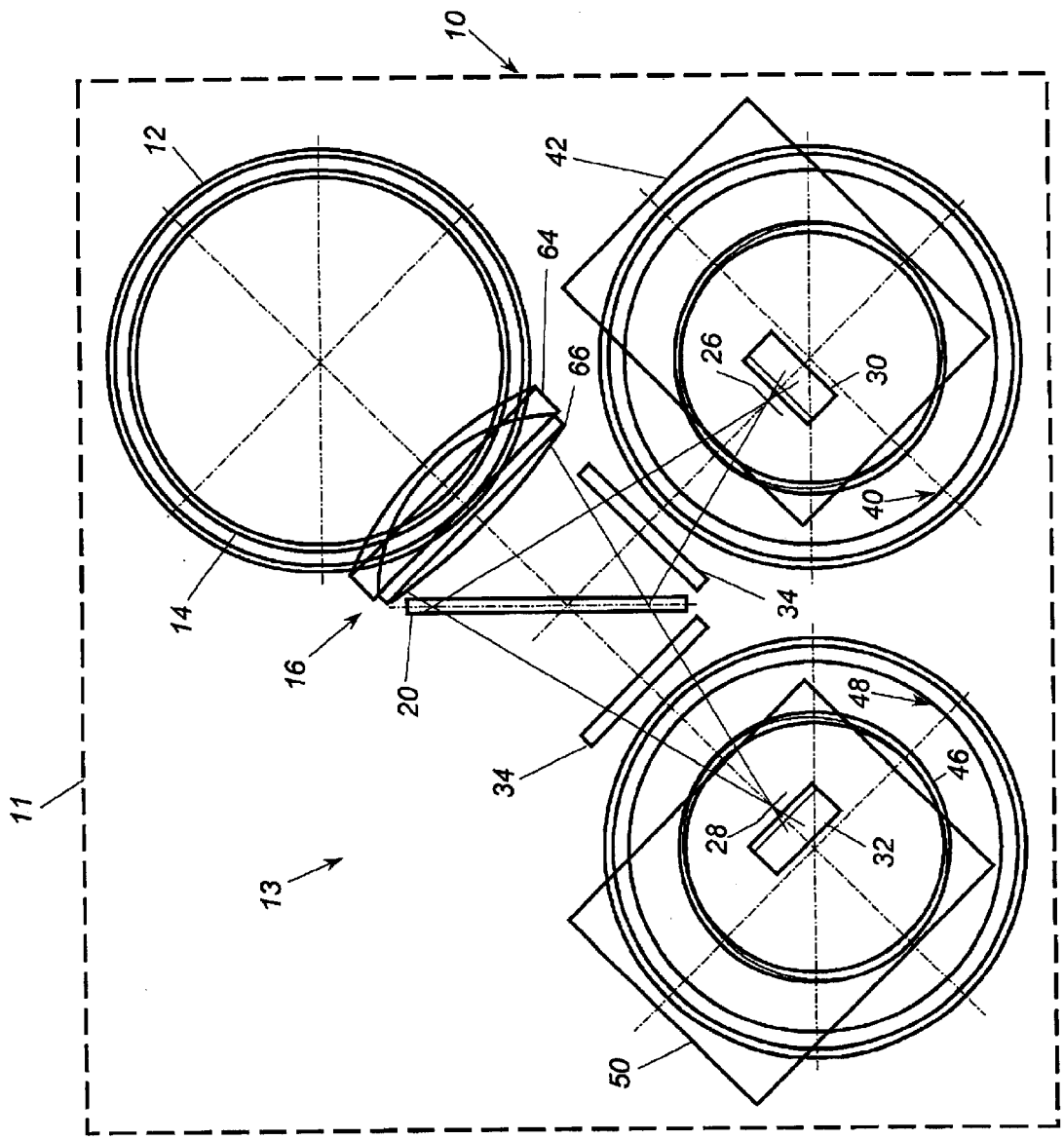
FIG. 1 is an end-view of a hyperspectral imaging instrument according to the present invention.
Figure 2:
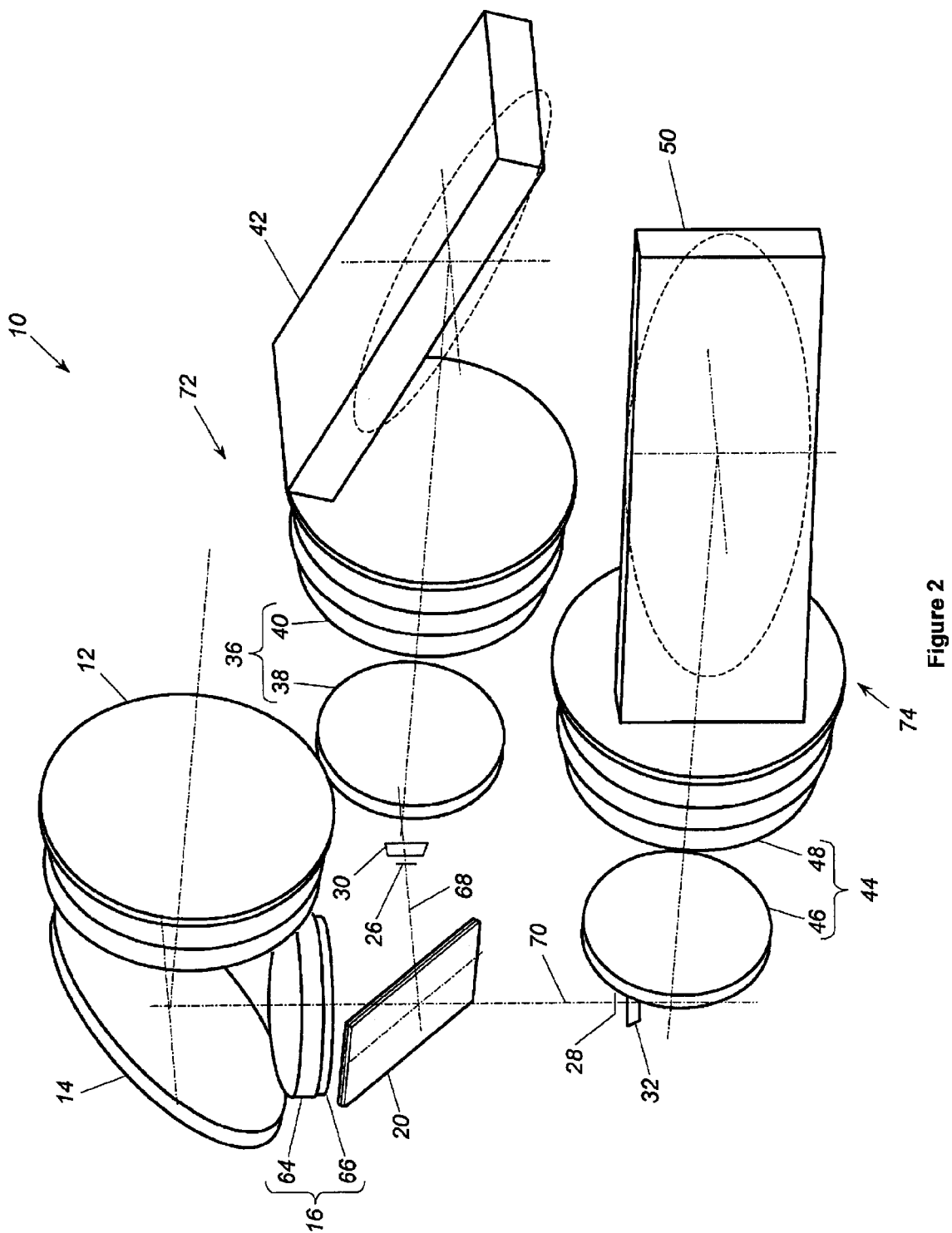
FIG. 2 is a plan perspective view of the optical assembly of the hyperspectral imaging instrument shown in FIG. 1.
Figure 3:
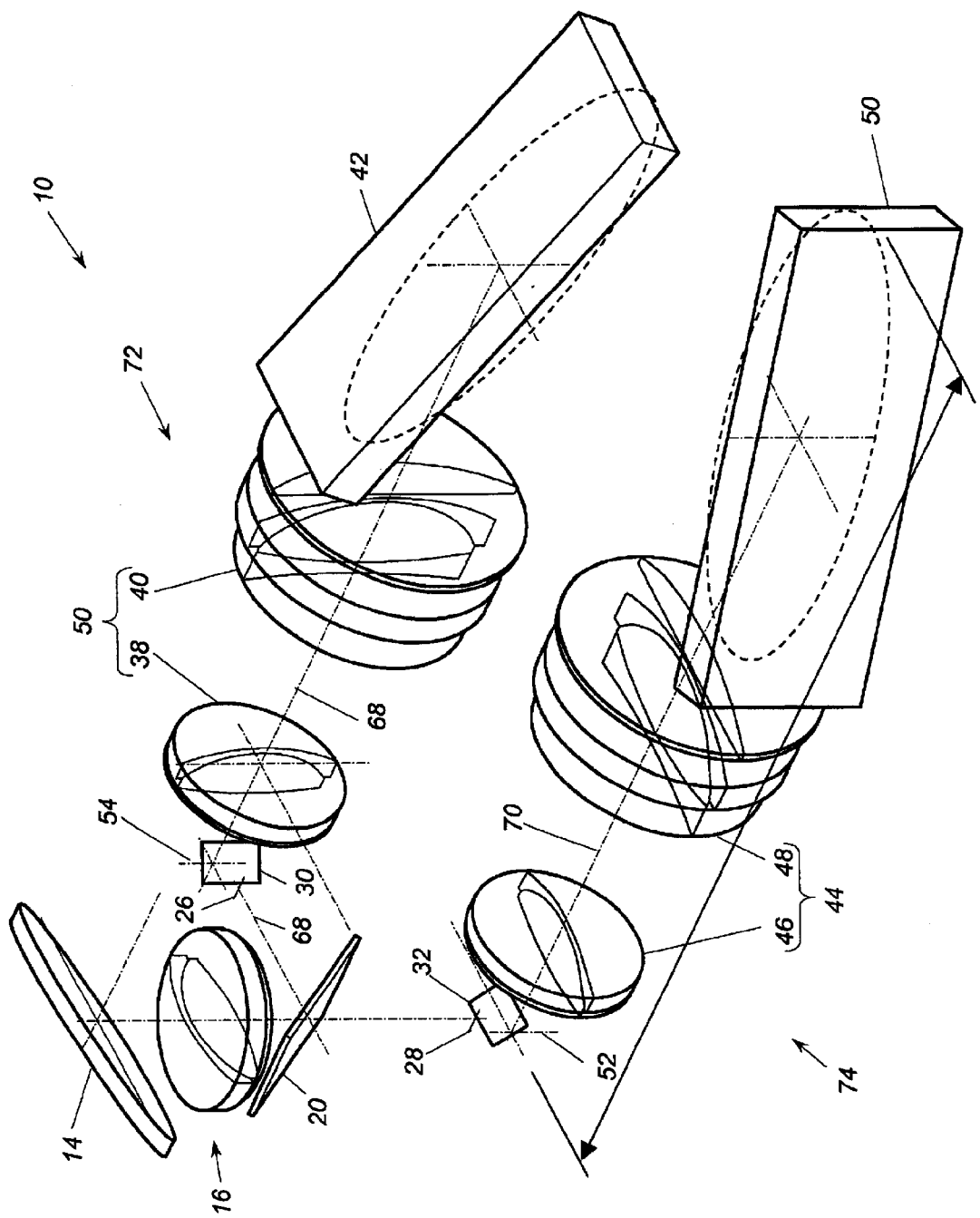
FIG. 3 is an another plan perspective view of the optical assembly of the hyperspectral imaging instrument shown in FIGS. 1 and 2.

FIG. 1 is an end-view and FIGS. 2 and 3 are plan perspective views of a hyperspectral imaging instrument 10 having a compact profile and an optical configuration suitable for a satellite based system, according to an embodiment of the present invention. The instrument 10 is enclosed within an enclosure 11. The empty space 13 within the enclosure accommodates supporting instruments and electronics. The instrument 10 includes a multi-element telescope objective lens 12 that receives light reflected from the atmosphere within a certain field of view, and focuses the light onto a predetermined focal plane to create an image of a spot in the field of view. In one embodiment, the telescope objective lens 12 has an aperture of 200 mm in diameter. However, this is by way of example in that other instruments can have other sized or configured object lenses for other applications within the scope of the present invention.

In this one embodiment, an optical folding mirror 14 directs the converging light from the multi-element telescope objective lens 12 into a multi-element lens assembly 16 that further focuses the light. In this embodiment, the mirror 14 is an elliptical aperture flat mirror tilted at 45 degrees, however, as will be appreciated by those skilled in the art, the mirror 14 can be omitted or have other aperture shapes such as circular or rectangular, or any other suitable shape consistent with the discussion herein. In this embodiment, the multi-element lens assembly 16 includes a concave lens 64 and a convex lens 66 that form a doublet lens. Those skilled in the art will appreciate that the multi-element lens assemblies 12 and 16 can have any combination of lenses suitable for the purposes described herein.

A dichroic beam splitter 20 receives and splits the light from the multi-element lens assembly 16 into a first (shortwave) beam path 68 and a second (longwave) beam path 70 for separate optical channels. In this embodiment, the beam splitter 20 is wavelength selective and separates the light beam into components of distinct wavelengths. The beam splitter 20 allows multiple optical channels to be provided for simultaneously analyzing atmospheric constituents in more than one spectral region. In this embodiment, a first channel is devoted to oxygen, and a second channel is devoted to carbon dioxide and methane. However, this is by way of a non-limiting example in that the instrument 10 can be tuned for other constituents and spectral regions as will become apparent from the discussion below. Shorter visible and near-infrared (near-IR) wavelengths for measuring oxygen are reflected off of the dichroic beam splitter 20, and longer near-IR and infrared wavelengths for measuring carbon dioxide and methane are transmitted through the dichroic beam splitter 20. An optional band-pass filter 34 for each channel is provided to further limit the wavelengths, reducing scattered light in the spectrographs and, with echelle diffraction gratings, eliminating light from all but the desired diffracted orders.

Figure 4:
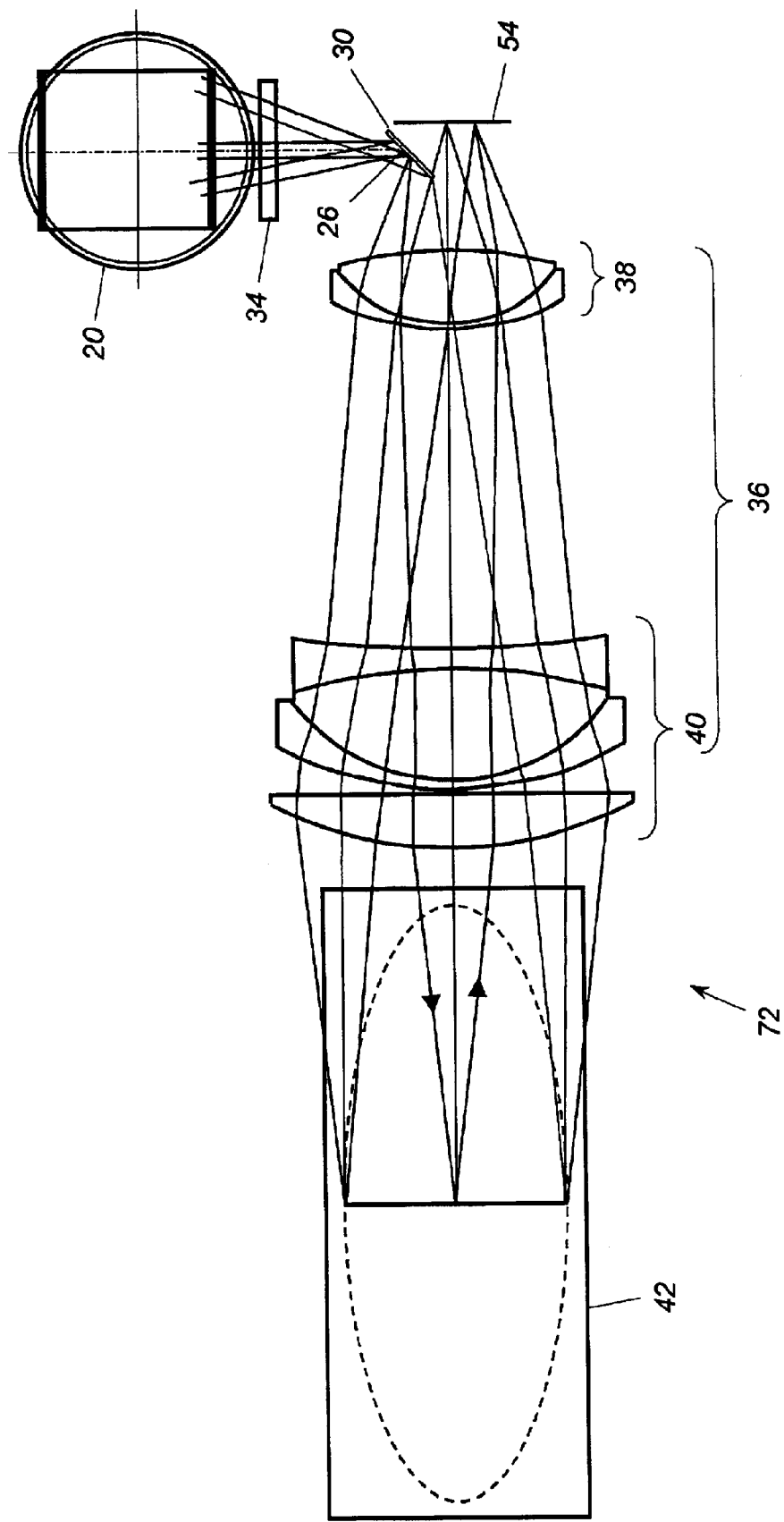
FIG. 4 is a side-view ray diagram of the hyperspectral imaging instrument shown in FIGS. 1–3 selectively showing the shortwave channel.

The visible and near-IR light in the first beam path 68 is directed by folding optics 30 into a first spectrograph 72 that measures oxygen. FIG. 4 is a side view of the optical configuration of the spectrograph 72. The light enters the spectrograph 72 through a slit 26 and is directed by a folding mirror 30 to a lens assembly 36, including spaced apart multi-element lens groupings 38 and 40. The lens elements 38 and 40 collect and collimate the diverging light from the slit 26. The collimated light from the lens assembly 36 impinges a diffraction grating 42 that separates the light into predetermined wavelengths. In this embodiment, the grating 42 is tuned to provide the wavelengths from which absorption characteristics of oxygen can be observed. As will be discussed in more detail below, the grating 42 can be any grating suitable for the purposes described herein.

The separated light reflected from the grating 42 returns through the lens assembly 36 which focuses it to form a spectrum. A portion of the returning light is directed by the lens element 38 onto a detector 54. In this embodiment, the detector 54 is a charge couple device (CCD) because it detects visible and near-IR light. In one particular embodiment, the detector 54 is a silicon array CCD detector that is about 40 mm in size. In alternate embodiments, other detectors suitable for other wavelengths of light can be employed within the scope of the present invention. The detector 54 provides a measurement of the absorption characteristics of the wavelengths of light separated by the grating 42. Processing circuitry (not shown) would receive voltage signals from the detector 54 and provide a representative output quantifying the absorption characteristics, as is well understood by those skilled in the art.

The longer wavelength near-IR and infrared light in the second beam path 70 is directed by a folding mirror 32 into a second spectrograph 74 that measures carbon dioxide and methane. The light enters the spectrograph 74 through a slit 28 and is directed by the folding mirror 32 to a lens assembly 44, including spaced apart multi-element lens groupings 46 and 48. The lens elements 46 and 48 collect and collimate the diverging light from the slit 28. The collimated light from the lens assembly 44 impinges a diffraction grating 50 that separates the infrared light into predetermined wavelengths. In this embodiment, the grating 50 is tuned to provide the wavelengths from which absorption characteristics of carbon dioxide and methane can be observed. As will be discussed in further detail below, the grating 50 can be any grating suitable for the purposes described herein.

The separated light reflected from the grating 50 returns through the lens assembly 44 which focuses it to form a spectrum. A portion of the returning light is directed by the lens element 46 onto a detector 52. In this embodiment, the detector 52 is a large format two-dimensional HgCdTe detector array, to detect near-IR and infrared light. In alternate embodiments, other detectors suitable for other wavelengths of light can be employed within the scope of present invention. The detector 52 provides a measurement of the absorption characteristics of the wavelengths of light provided by the grating 50. Processing circuitry (not shown) would receive voltage signals from the detector 52 and provide a representative output quantifying the absorption characteristics, as is well understood to those skilled in the art.

To achieve the required high spectral resolution, the shortwave channel grating 42 and the longwave channel grating 50 are highly inclined relative to the incoming light. When configured as found here with double-pass spectrograph collimator and camera lens systems, the angles of inclination of the gratings 42 and 50 are close to those referred to as the 'blaze angles' ($\theta_B$) of the gratings. The gratings themselves are identified as echelle gratings in this embodiment. Other appropriate gratings can also be effectively used, such as ruled gratings, holographic gratings, etc. The product of the number of illuminated rulings on the grating surface times the diffracted order number is directly proportional to the spectral resolution. The gratings in the shortwave channel grating 42 and the longwave channel grating 50 of this embodiment are selected to have high dispersive power ($\lambda d\beta/d\lambda \cong 5.4$) to give resolving powers of $R=\lambda/\Delta\lambda=20,000$.

Optics and spectrographs inevitably have scattered light, since not all of the light that reaches the detector follows the intended path (e.g., due to dust in the optics). Unless the diffused light in the background is known or can be determined, the results of spectral line strength measurements will be erroneous.

Figure 5:
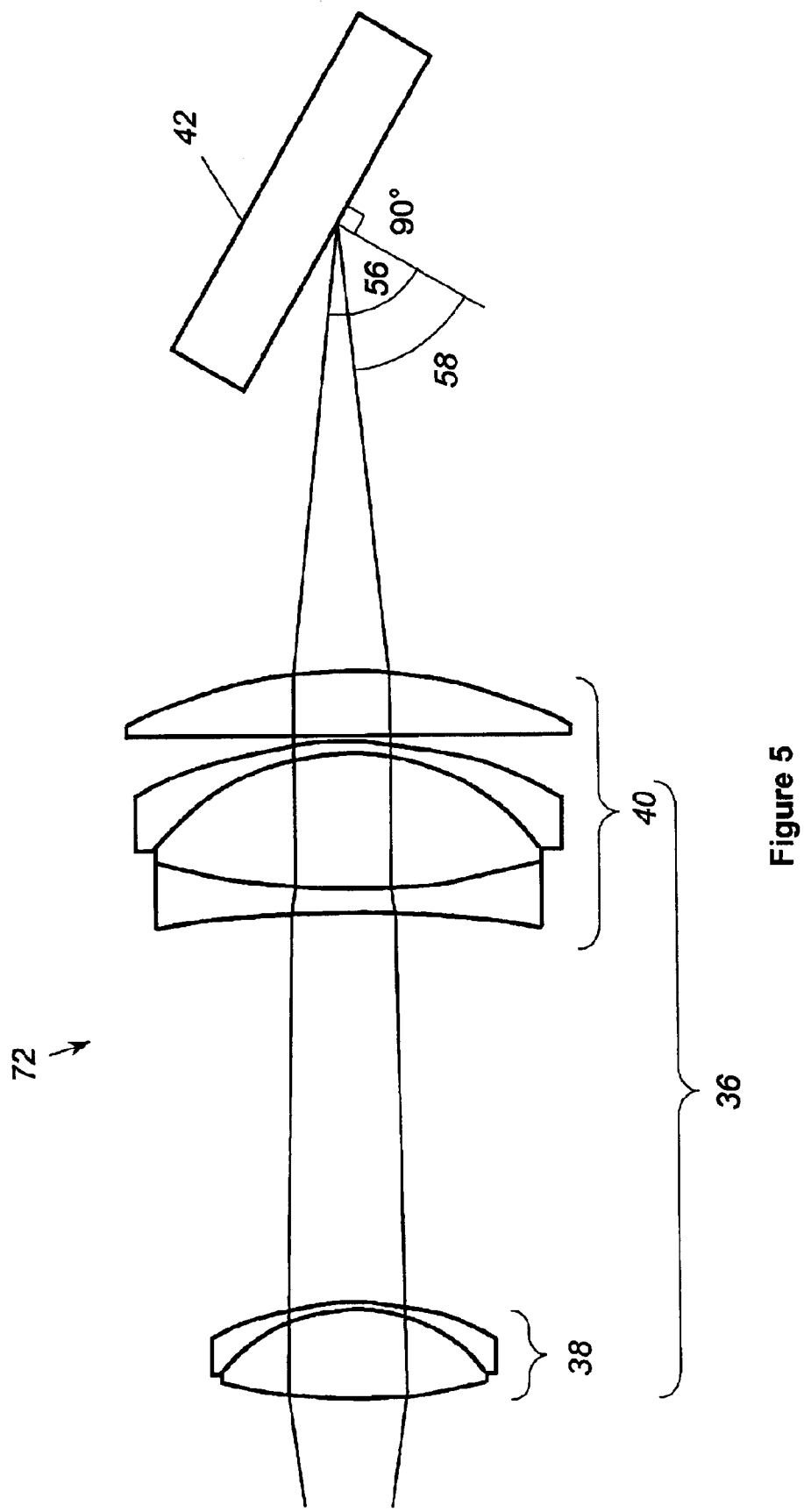
FIG. 5 is a side-view diagram showing a possible angular arrangement of a selected shortwave channel for the hyperspectral imaging instrument shown in FIGS. 1–3.

FIG. 5 depicts the angular arrangement of the shortwave light channel in the spectrograph 72. A similar arrangement is used for the longwave channel. To improve the grating efficiency, an alpha (α) angle 56 between the grating normal and the collimated light beam should preferably be equal to or greater than the beta (β) angle 58 between the grating normal and the diffracted light because of groove shadowing effects. Anamorphic demagnification will decrease the size of the projected image of the slit 26 (shown in FIG. 4) onto the detector 54 (shown in FIG. 4) by an anamorphic factor of $\cos(\alpha)/\cos(\beta)$, resulting in slightly improved spectral resolution (for a given slit width), or permitting a slight increase in slit width and throughput for a given spectral resolution, for the in-plane grating geometry ($\gamma=0$) of FIG. 5.

The Quasi-Littrow grating illumination geometry could be used, where the alpha angle 56 equals the beta angle 58 which equals $\theta_B$, and $\gamma \neq 0$, where $\gamma$ is the out of plane angle and $\theta_B$ is the grating blaze angle, in order to provide separation between the input and diffracted beams at the grating 42. This is done to avoid narcissus effects observed near Littrow when $\gamma=0°$ and the angle 56 and the angle 58 differ from $\theta_B$ by only a few degrees. The Quasi-Littrow configuration is also more economical in minimizing field of view in the camera focal plane imaged onto the detector.

In one embodiment, the effective focal length of the lens assemblies 36 and 44 is 260 mm giving a pupil diameter of 130 mm at the diffraction grating. The length of the optical assembly from the detector 52 or 54 to the grating 50 or 42 is 810 mm. The optical axis of the lens assembly 36 for the shortwave channel and the lens assembly 44 for the longwave channel are aligned parallel to the original telescope objective 12 and are 250 mm apart. The instrument 10 may be enclosed in a square housing 11 (FIG. 1) with space 13 for appropriate support systems, such as a cryocooler, instrument electronics, and other support hardware.

Figure 6:
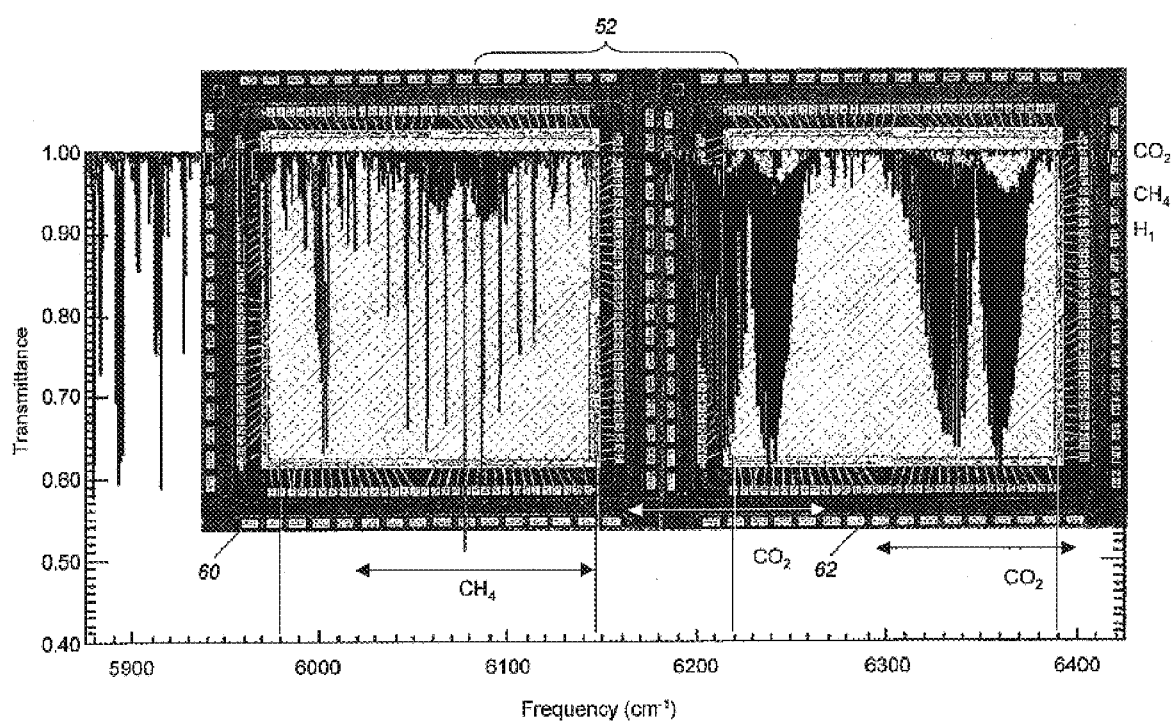
FIG. 6 is a representation of the spectrum superimposed on a mosaic HgCdTe detector associated with the hyperspectral imaging instrument shown in FIGS. 1–3.

Referring to FIG. 6, in order to detect, in one embodiment, both carbon dioxide and methane, the focal plane 52 includes a pair of detectors positioned side by side. FIG. 6 is a representation of the spectrum superimposed on a carbon dioxide HgCdTe detector 60 and a methane HgCdTe detector 62. The HgCdTe detector 60 records carbon dioxide features in the spectral range of $1.56\ \mu m \leq \lambda \leq 1.61\ \mu m$, and the detector 62 records methane features in the adjacent spectral range of $1.63\ \mu m \leq \lambda \leq \mu 1.68\ m$.

Figure 7:
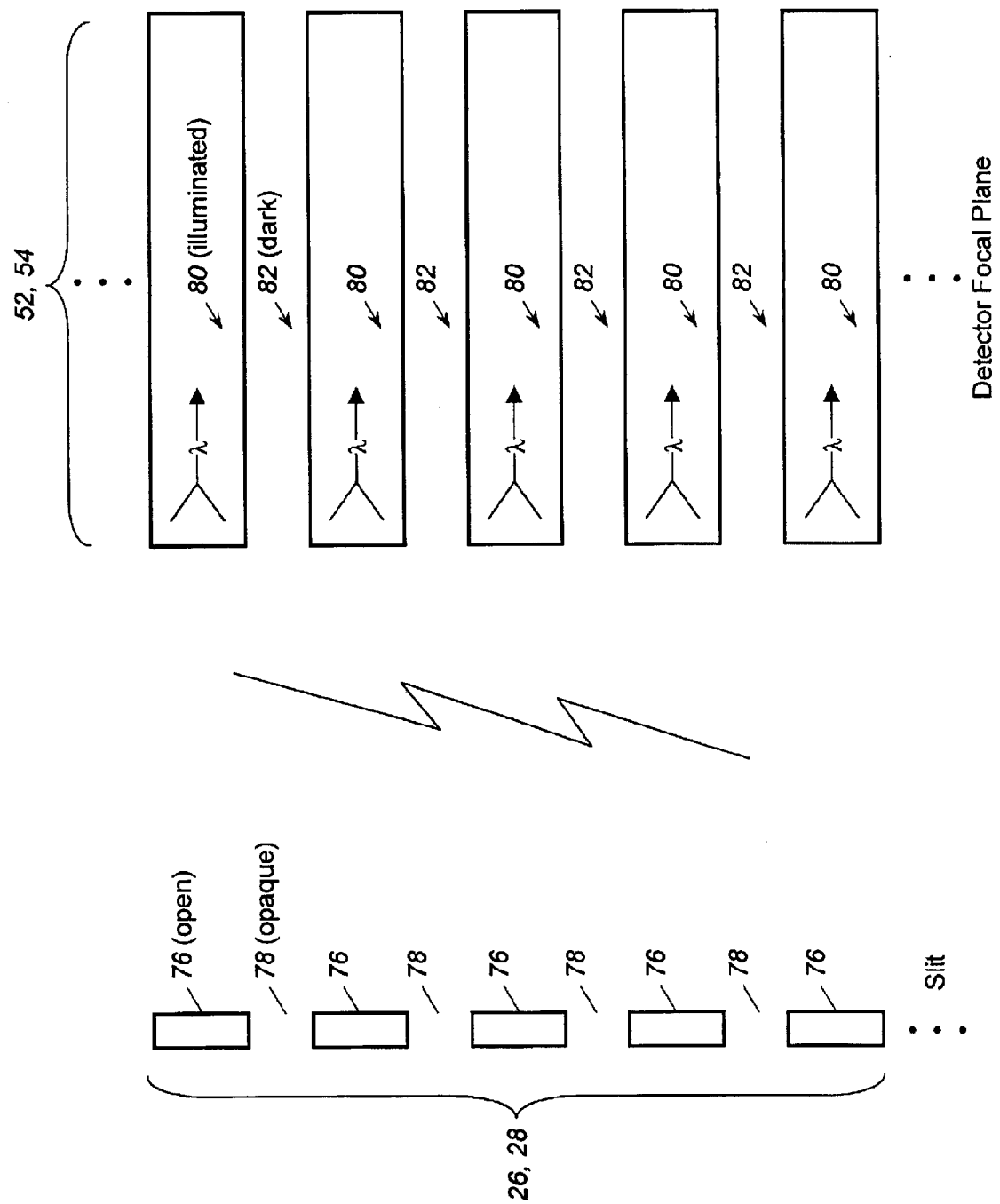
FIG. 7 shows longwave slit and the shortwave slit being interrupted with multiple opaque regions.

Referring to FIG. 7, the longwave slit 28 and the shortwave slit 26 are interrupted with multiple opaque regions 78 which allow one to determine the scattered light background. Due to the diffused effect, the scattered light background will still be present on the detectors 52 and 54 in the "dark" regions 82 corresponding to the opaque regions 78 of the slits 26 and 28, respectively. Scattered light should be measured in the dark regions 82 and interpolated across the illuminated spectra 80 to determine the scattered light correction at each wavelength $\lambda$.

In an embodiment, the field of view to be analyzed by the instrument 10 through the slits 26 and 28 is divided into one km ground sample distance segments 76, with interleaved opaque sections 78 of a selected relative size, such as one-fourth km, one-half km, etc. A conventional spectrograph could be retrofitted with an alternating open and opaque slit as an aid to characterizing its scattered light. Spectra within the one km ground sample distance sections may be co-added to increase the signal to noise quality of the measurement as desired. For example, instead of a contiguous 20 km slit section, twenty separated one kilometer slit segments could be recorded on the detectors.

The invention can be adapted for various payload requirements for a ground, aircraft or spacecraft based mounting. In a non-ground based mounting, the mode of operation can be a push-broom where the input slit aperture is perpendicular to the velocity motion of the aircraft or spacecraft. Alternately, whisk-broom scanning mode of operation is also possible, where the input aperture is parallel to the orbit motion, and a rotating mirror in front of the telescope does the scanning perpendicular to the velocity motion.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A high resolution hyperspectral imaging apparatus for studying atmospheric components in a predetermined field of view, said apparatus comprising:

an optical telescope including an objective lens for focusing an optical beam received from the field of view;

a beam splitter responsive to the converging optical beam from the telescope, said beam splitter separating the optical beam into a first beam directed along a first beam path and a second beam directed along a second beam path;

a first slit and first spectrograph positioned in the first beam path for analyzing said first optical beam, wherein the first spectrograph includes a first lens assembly, a first grating and a first detector, said first grating separating the first beam into a first set of predetermined spectral components, said separated first beam being directed through the first lens assembly onto the first detector; and a second slit and second spectrograph positioned in the second beam path for analyzing said second beam, wherein the second spectrograph includes a second lens assembly, a second grating and a second detector, said second grating separating the second beam into a second set of predetermined spectral components, said separated second beam being directed through the second lens assembly onto the second detector.

2. The apparatus of claim 1 wherein the first beam is collimated and later refocused by the first lens assembly and the second beam is collimated and later refocused by the second lens assembly, both the first lens assembly and the second lens assembly being operated in a double-pass configuration.

3. The apparatus of claim 1 wherein the first lens assembly and the second lens assembly each includes a front lens group and a rear lens group.

4. The apparatus of claim 1 further comprising a mirror disposed along a propagation axis of said optical telescope, said mirror directing the optical beam to the beam splitter.

5. The apparatus of claim 1 wherein the optical telescope comprises a front objective lens group and a rear lens group for focusing the optical beam through the beam splitter and onto the first slit and the second slit.

6. The apparatus of claim 1 wherein said beam splitter is a dichroic beam splitter, and wherein the first optical beam includes primarily visible light and near-infrared wavelengths, and the second optical beam includes primarily longer wavelength near-infrared and infrared wavelengths.

7. The apparatus of claim 6 wherein said first spectrograph analyzes oxygen and said second spectrograph analyzes carbon dioxide and methane.

8. The apparatus of claim 1 wherein said first detector is a charged couple device and said second detector includes at least one HgCdTe detector.

9. The apparatus of claim 8 wherein the second detector comprises a mosaic of at least two HgCdTe detectors, said mosaic of HgCdTe detectors detecting both carbon dioxide and methane.

10. A high spectral resolution hyperspectral imaging apparatus for studying atmospheric components in a predetermined field of view, said apparatus comprising:

an optical telescope including an objective lens group for initiating the focusing of an optical beam received from the field of view;

a rear multi-element lens positioned to receive and focus the optical beam from the objective lens group of the optical telescope;

a dichroic beam splitter responsive to the converging optical beam from the multi element lens, said beam splitter separating the optical beam into a first optical beam of shorter light wavelengths directed along a first beam path and a second optical beam of longer wavelengths directed along a second beam path;

a first spectrograph positioned in the first beam path for analyzing said first optical beam, said first spectrograph including a first lens assembly, a first grating and a first detector, said first grating separating the first beam into a first set of predetermined spectral components, said separated first beam being directed back through the first lens assembly onto the first detector; and a second spectrograph positioned in the second beam path for analyzing said second beam, said second spectrograph including a second lens assembly, a second grating and a second detector, said second grating separating the second beam into a second set of predetermined spectral components, said separated second beam being directed back through the second lens assembly onto the second detector.

11. The apparatus of claim 10 wherein the first beam is collimated by the first lens assembly and the second beam is collimated by the second lens assembly.

12. The apparatus of claim 10 wherein the first lens assembly and the second lens assembly each includes a front lens and a rear lens.

13. The apparatus of claim 10 wherein said first spectrograph analyzes oxygen and said second spectrograph analyzes carbon dioxide and methane.

14. The apparatus of claim 13 wherein said first detector is a charged couple device and said second detector includes at least one HgCdTe detector.

15. The apparatus of claim 14 wherein the second detector comprises a mosaic of at least two HgCdTe detectors, said mosaic of HgCdTe detectors detecting both carbon dioxide and methane.

16. A method for hyperspectral imaging, said method comprising:

admitting light from an external source into a telescope;

splitting the light received by the telescope into at least two separate light beams, each light beam light including separate wavelength bands; and analyzing each light beam to determine if predetermined constituents are present in the beam, where each light beam is analyzed by directing the light beam through a collimating lens assembly;

reflecting the collimated light beam off a grating to separate the light beam into separate beam wavelengths;

directing the separate beam wavelengths back through lens assembly; and detecting the separate beam wavelengths.

17. The method of claim 16 wherein said gratings are high dispersion holographic and echelle gratings.

18. The method of claim 16 wherein said gratings are high dispersion gratings selected from the group consisting of holographic and echelle gratings.

19. The method of claim 16 wherein splitting the light includes splitting the light into a visible light and near-infrared beam and a longer wavelength near-infrared and infrared light beam.

20. The method of claim 19, wherein analyzing each light beam includes detecting lines of oxygen in a shortwave channel and detecting lines of methane and carbon dioxide in a longwave channel.

* * * * *